(12) United States Patent
Saarnivala et al.

(10) Patent No.: US 12,143,470 B2
(45) Date of Patent: Nov. 12, 2024

(54) HANDLING OF MACHINE-TO-MACHINE SECURE SESSIONS

(71) Applicants: ARM IP LIMITED, Cambridge (GB); ARM LIMITED, Cambridge (GB)

(72) Inventors: Mikko Johannes Saarnivala, Oulu (FI); Szymon Sasin, Oulu (FI); Yongbeom Pak, Oulu (FI); Hannes Tschofenig, Tirol (AT)

(73) Assignees: ARM IP LIMITED, Cambridge (GB); ARM LIMITED, Cambridge (GB)

( * ) Notice: Subject to any disclaimer, the term of this patent is extended or adjusted under 35 U.S.C. 154(b) by 74 days.

(21) Appl. No.: 17/310,338

(22) PCT Filed: Jan. 9, 2020

(86) PCT No.: PCT/GB2020/050048
§ 371 (c)(1),
(2) Date: Jul. 28, 2021

(87) PCT Pub. No.: WO2020/157454
PCT Pub. Date: Aug. 6, 2020

(65) Prior Publication Data
US 2022/0353060 A1 Nov. 3, 2022

(30) Foreign Application Priority Data

Feb. 1, 2019 (GB) ...................... 1901421

(51) Int. Cl.
*H04L 9/08* (2006.01)
*H04L 67/146* (2022.01)

(52) U.S. Cl.
CPC .......... *H04L 9/0825* (2013.01); *H04L 9/0869* (2013.01); *H04L 9/0891* (2013.01); *H04L 67/146* (2013.01)

(58) Field of Classification Search
None
See application file for complete search history.

(56) References Cited

U.S. PATENT DOCUMENTS 7,778,194 B1    8/2010  Yung
9,705,769 B1 *  7/2017  Sarangapani ......... H04L 9/3242
(Continued)

FOREIGN PATENT DOCUMENTS

DE    102017210721    12/2018
EP    2254310         11/2010
(Continued)

OTHER PUBLICATIONS

International Search Report and Written Opinion corresponding to PCT/GB2020/051093, dated Jun. 25, 2020.
(Continued)

*Primary Examiner* — Bassam A Noaman
(74) *Attorney, Agent, or Firm* — DeWitt LLP

(57) ABSTRACT

The present techniques generally describe a computer implemented method for establishing a secure communication session between a client device and a first server, the method performed by the client device comprising: obtaining, from a second server, credential data comprising a session identifier and cryptographic key data; performing a connection handshake with the first server to establish the secure communication session; creating a security state record defining one or more parameters used to establish the secure communication session, and associating the session identifier with the security state record; performing a first resumption handshake with the first server using the session identifier to re-establish the secure communication session.

10 Claims, 11 Drawing Sheets

(56) References Cited

U.S. PATENT DOCUMENTS

| | | | |
|---|---|---|---|
| 10,055,591 B1* | 8/2018 | Sharifi Mehr | G06F 21/36 |
| 2010/0317430 A1* | 12/2010 | Multerer | A63F 13/73 463/29 |
| 2014/0126416 A1* | 5/2014 | Yu | H04W 4/021 370/254 |
| 2015/0288514 A1* | 10/2015 | Pahl | H04L 63/166 713/171 |
| 2016/0234177 A1* | 8/2016 | Bone | H04L 67/1095 |
| 2019/0007836 A1 | 1/2019 | Ocak | |
| 2021/0120406 A1* | 4/2021 | Ocak | G06F 9/4416 |

FOREIGN PATENT DOCUMENTS

| | | |
|---|---|---|
| WO | 2009/055802 A1 | 4/2009 |
| WO | WO2009055802 | 4/2009 |
| WO | 2017/131564 A1 | 8/2017 |
| WO | WO2017131564 | 8/2017 |
| WO | WO2018/189507 | 10/2018 |

OTHER PUBLICATIONS

International Preliminary Report on Patentability corresponding to PCT/GB2020/051093, dated Nov. 25, 2021.
Combined Search and Examination Report corresponding to GB2002697.7, dated Sep. 1, 2020.
Examination Report corresponding to GB2002697.7, dated Jul. 14, 2021.
International Search Report and Written Opinion corresponding to PCT/GB2020/050279 dated May 4, 2020.
International Preliminary Report on Patentability corresponding to PCT/GB2020/050279 dated Nov. 25, 2021.
Examination Report corresponding to GB1917404.4 dated Feb. 24, 2021.
Combined Search Report and Examination Report corresponding to GB1917404.4 dated May 28, 2020.
International Search Report and Written Opinion corresponding to PCT/GB2020/050048 dated Jun. 23, 2020.
International Preliminary Report on Patentability corresponding to PCT/GB2020/050048 dated Aug. 12, 2021.
Combined Search Report and Examination Report corresponding to GB1901421.6, dated Aug. 1, 2019.
Examination Report corresponding to GB1901421.6 dated Aug. 18, 2020.
Examination Report corresponding to GB1901421.6 dated Apr. 9, 2021.
OMA, 2018, "Lightweight Machine to Machine Technical Specification: Core", pp. 1-142 URL: http://openmobilealliance.org/RELEASE/LightweightM2M/V1_1-20180612-C/OMA-TS-LightweightM2M_Core-VI_1-20180612-C.pdf Section E. 1.
OMA, 2018, "Lightweight Machine to Machine Technical Specification: Transport Bindings", pp. 1-67 URL: http://www.openmobilealliance.org/release/LightweightM2M/V 1_1-20180710-A/OMA-TS-LightweightM2M_Transport-V1_1-20180710-A.pdf.
OMA, 2019, Hannes Tschofenig, "Multiple Transports in LwM2M", pp. 1-7 URL: http ://member. openmobilealliance.org/ftp/public_documents/dm/2019/OMA-DM&SE-2019-0047-INP_multiple_transports.zip the whole document.
Open Mobile Alliance, 2019, Mateusz Krawiec, "Relation of Binding mode and Security instances in LWM2M 1. 1, issue—459" URL:https://github.com/OpenMobileAlliance/OMA_LwM2M_for_Developers/issues/459 section related to contribution dated Mar. 19, 2019.
Dierks, T. et al. IETF RFC5246 "The Transport Layer Security (TLS) Protocol Version 1.2", IETF, Aug. 2008.
Eronen, P. IETF RFC 4279 "Pre-Shared Key Ciphersuites for Transport Layer Security (TLS)", The Internet Society, Dec. 2005.
3GPP Standard; Technical Specification, vol. SA WG3, 2018, 3rd Generation Partnership Project: Technical Specification Group Services and System Aspects; Generic Authentication Architecture (GAA); Generic Bootstrapping Architecture (GBA), pp. 1-93 URL: http://www.3gpp.org/ftp//S pees/ archive/3 3_series/3 3. 220/3 3 220-f40.zip the whole document.
Datagram Transport Layer Security Version 1.2, 2012, Rescorla RTFM E et al, "Datagram Transport Layer Security Version 12; rfc6347.txt", pp. 1-32 the whole document.
Menzes, A. et al. "Handbook of Applied Cryptography", Published 2001, CRC Press.
Examination Reporting corresponding to GB 1901421.6 dated Nov. 14, 2022.

\* cited by examiner

HANDLING OF MACHINE-TO-MACHINE SECURE SESSIONS

The present techniques generally relate to enabling secure communications between devices, and in particular to reducing the amount of data exchanged between machines when establishing such secure communications.

There are ever increasing numbers of devices within the home, other buildings or the outdoor environment that have processing and communication capabilities which allow them to communicate with other entities (e.g. devices, servers, services etc.) within the same network or on a different network (e.g. on the internet) to access servers or services as part of the "Internet of Things" (IoT)

For example, a temperature device in a home may gather sensed data and push the sensed data to a remote service (such as an application running in 'the cloud'). The temperature device may then be controlled remotely by the remote service via received command data.

In other examples, a pollution monitoring device in a factory may comprise a sensor to gather information from various chemical sensors and arrange maintenance based on the gathered information; whilst a healthcare provider may use devices comprising sensors, such as a heart rate monitor to track the health of patients while they are at home.

Data is generally transmitted between devices and other entities using machine-to-machine (M2M) communication techniques, and the present applicant has recognised the need for improved (M2M) communication techniques.

According to a first technique there is provided a computer implemented method for establishing a secure communication session between a client device and a first server, the method performed by the client device comprising: obtaining, from a second server, credential data comprising a session identifier and cryptographic key data; performing a connection handshake with the first server to establish the secure communication session; creating a security state record defining one or more parameters used to establish the secure communication session, and associating the session identifier with the security state record; performing a first resumption handshake with the first server using the session identifier to re-establish the secure communication session.

According to a further technique there is provided a computer implemented method for establishing a secure communication session between a client device and a first server, the method performed by the first server comprising: obtaining, from a second server, credential data comprising a session identifier and cryptographic key data; performing a connection handshake to establish a secure communication session with the client device; storing a security state record defining one or more parameters used to establish the secure communication session, and associating the session identifier with the security state record; receiving, from the client device, the session identifier as part of a first resumption handshake; obtaining the security state record based on or in response to the session identifier; re-establishing the secure communication session with the client device based on or in response to one or more of the parameters defined in the security state record.

According to a further technique there is provided a computer implemented method for establishing a secure communication session between a client device and a first server, the method performed by the client device comprising: obtaining, from a second server, cryptographic key data comprising a cryptographic key and a cryptographic key identifier; transmitting, to the first server, the cryptographic key identifier and defining one or more parameters as part of a connection handshake; establishing the secure communication session responsive to a successful connection handshake; responsive to the subsequent termination of the secure communication session: communicating with the first server using the cryptographic key data and the one or more parameters.

According to a further technique there is provided a computer implemented method for establishing a secure communication session between a client device and a first server, the method performed by the first server comprising: obtaining, from a second server, cryptographic key data comprising a cryptographic key; receiving, from the client device, a cryptographic key identifier and defining one or more parameters as part of a connection handshake; establishing the secure communication session responsive to a successful connection handshake; responsive to the subsequent termination of the secure communication session: communicating with the client device using the cryptographic key data corresponding to the cryptographic key identifier and the one or more parameters.

According to a further technique there is provided a computer implemented method for establishing a secure communication session between a client device and a first server, the method performed by the client device comprising: obtaining, from a second server, credential data comprising cryptographic key data and one or more parameters; creating a security state record based on or in response to the credential data; receiving, from the first server, a message comprising encrypted data and a connection identifier corresponding to the security state record; decrypting the encrypted data based on or in response to the cryptographic key data and one or more parameters of the security state record corresponding to the connection identifier.

According to a further technique there is provided a computer implemented method for establishing a secure communication session between a client device and a first server, the method performed by the first server comprising: obtaining credential data comprising cryptographic key data and one or more parameters; creating a security state record based on or in response to the credential data; receiving, from the client device, a message comprising encrypted data and a connection identifier corresponding to the security state record; decrypting the encrypted data based on or in response to the cryptographic key data and one or more parameters of the security state record corresponding to the connection identifier.

The techniques are diagrammatically illustrated, by way of example, in the accompanying drawings, in which.

Reference is made in the following detailed description to accompanying drawings, which form a part hereof, wherein like numerals may designate like parts throughout that are corresponding and/or analogous. It will be appreciated that the figures have not necessarily been drawn to scale, such as for simplicity and/or clarity of illustration. For example, dimensions of some aspects may be exaggerated relative to others. Further, it is to be understood that other embodiments may be utilized. Furthermore, structural and/or other changes may be made without departing from claimed subject matter. It should also be noted that directions and/or references, for example, such as up, down, top, bottom, and so on, may be used to facilitate discussion of drawings and are not intended to restrict application of claimed subject matter.

Figure 1:
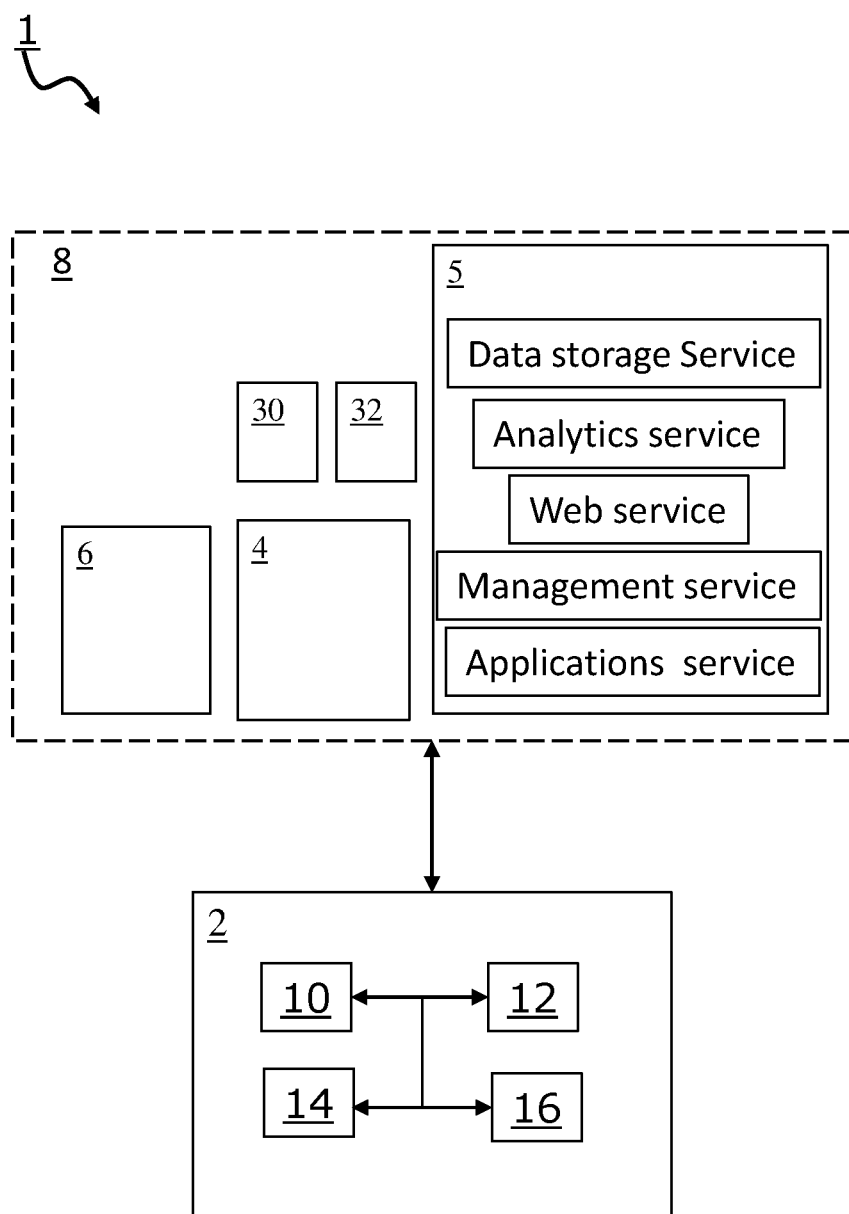
FIG. 1 shows an example deployment scenario for a client device according to the present techniques.

FIG. 1 shows a deployment scenario 1 for a device 2 according to the present techniques.

Device 2 may be a computer terminal, a laptop, a tablet or mobile-phone, or may, for example, be a lightweight M2M (LwM2M) device used to provide smart functionality for streetlights, electric meters, temperature sensors, building automation, healthcare, and a range of other market segments as part of the IoT. It will be appreciated that the examples of market segments listed above are for illustrative purposes only and the claims are not limited in this respect.

Device 2 is operable to communicate with one or more servers and/or services.

As described herein a server (depicted in FIG. 1 as "server 4", "server 6") may be a single computing device or software running on a computing device. However, the claims are not limited in this respect and the server may comprise a plurality of interconnected computing devices (or software running on a plurality of interconnected devices), whereby the plurality of interconnected computing devices may be distributed over one or more public and/or private networks.

In the present figures, server 4 may, for example, be an application server, an edge server, a computer terminal, a laptop, a tablet or mobile-phone, or an application hosted on a computing device, and which provides deployment of one or more services (depicted in FIG. 1 as "service 5"). Such services may include one or more of: web service(s); data storage service; analytics service(s), management service(s) and application service(s), although this list is not exhaustive.

In the present figures server 6 comprises a bootstrap server which is used to provision resources on the device 2. In embodiments, bootstrap server 6 may be any type of server or remote machine and may not necessarily be a dedicated bootstrap server. Generally speaking the bootstrap server 6 is any means suitable to perform a bootstrap process with the device 2 (e.g. machine, hardware, technology, server, software, etc.).

In the present examples, the server 4, bootstrap server 6 and/or services 5 are depicted as being part of a device management platform 8, such as the Pelion™ device management platform from Arm®, Cambridge, UK.

In the present examples the client device 2 is depicted as a LwM2M device having an LwM2M client thereon and server 4 is depicted as an LwM2M server, such that the LwM2M server 4 and client device 2 communicate using protocols in compliance with the Open Mobile Alliance (OMA) LWM2M specification. The bootstrap server may also be an LwM2M bootstrap server. However, the claims are not limited to the client device and/or server having to communicate in compliance with the Open Mobile Alliance (OMA) LWM2M specification.

The device 2 comprises communication circuitry 10 for communicating with the one or more servers 4 and/or services 5.

The communication circuitry 10 may use wireless communication such as, for example, one or more of: Wi-Fi; short range communication such as radio frequency communication (RFID); near field communication (NFC); communications used in wireless technologies such as Bluetooth®, Bluetooth Low Energy (BLE); cellular communications such as 3G or 4G; and the communication circuitry 10 may also use wired communication such as a fibre optic or metal cable. The communication circuitry 10 could also use two or more different forms of communication, such as several of the examples given above in combination.

It will be appreciated that the device 2 could also use any suitable protocols for communications including one or more of: IPv6, IPv6 over Low Power Wireless Standard (6LoWPAN®), Constrained Application Protocol (CoAP), Message Queuing Telemetry Transport (MQTT), Representational state transfer (REST), HTTP, WebSocket, ZigBee®, Thread® although it will be appreciated that these are examples of suitable protocols.

As an illustrative example, CoAP defines the message header, request/response codes, message options and retransmission mechanisms, such as, for example, RESTful Application Programming Interfaces (APIs) on resource-constrained devices and supports the methods of GET, POST, PUT, DELETE, which can be mapped to methods of the HTTP protocol.

M2M communications are typically required to be secure to reduce the risk that malicious third parties gain access to the data, or to limit the access to data, by devices, servers or services. The device may use one or more security protocols to establish a communications path or channel for providing secure communications between entities as will be described in further detail below.

The device 2 further comprises processing circuitry 12 for controlling various processing operations performed by the device 2.

The device 2 may further comprise input/output (I/O) circuitry 14, such that the device 2 can receive inputs (e.g. user inputs, sensor inputs, measurement inputs etc.) and or generate outputs (e.g. audio/visual/control commands etc.).

The device 2 further comprises storage circuitry 16 for storing resources, such as credential data, whereby the storage circuitry 16 may comprise volatile and/or non-volatile memory.

Such credential data may include one or more of: certificates, cryptographic keys (e.g. shared symmetric keys, public keys, private keys), identifiers (e.g. direct or indirect identifiers) whereby such credential data may be used by the device to authenticate (e.g. connect, establish secure communications, register, enrol etc.) with one or more remote entities (e.g. a bootstrap server/server/services).

As above, the client device may use one or more security protocols to authenticate with another server. As an illustrative example, Transport Layer Security (TLS) and Datagram Transport Layer Security (DTLS) may be used to secure communication between a client device and a server (e.g. bootstrap server, LwM2M server, application server etc). The data (e.g. credential data) protected by TLS/DTLS may be encoded as plain text, binary TLV, JSON, CBOR, or any other suitable data exchange format.

The client device may perform a connection handshake with another entity to mutually authenticate each other and to negotiate different protocols related to communication, encryption etc.

In TLS/DTLS, during a connection handshake process, the client device and server exchange their digital certificates which may be X.509 certificates (also known as, and referred to herein, as identity certificates or public key certificates). Digital certificates comprise credential data is which used to prove the ownership of a public key that is used as part of an asymmetric key algorithm (i.e. which forms part of a public-private key pair). A digital certificate typically comprises information about the public key, information about the identity of its owner (e.g. the client device or server), and the digital signature of an issuing entity that has verified the contents of the certificate (e.g. a trusted third party such as a certificate authority). A digital certificate can be large, particularly if it comprises a certificate chain, or if each certificate is an RSA certificate (i.e. where a public key is based on two large prime numbers). For example, a single RSA-based certificate containing a 2048-bit key may be at least 1024 bytes in size. Similarly, at least the first time a TLS/DTLS connection handshake is performed between a client device and a server, the client device and server need to decide on which cryptographic algorithm(s) or ciphers or cipher suites they will use to secure communication sessions. For example, the client device may send a list of cipher suites that it supports, potentially in order of preference. The server selects a cipher suite from the list and informs the client device of this selection. The list of cipher suites may be large, which increases the amount of information sent between machines during a TLS/DTLS connection handshake. This means that every time a client device and a server perform a connection handshake process to begin a secure communication session (i.e. a session during which the client device and server exchange encrypted messages), large amounts of data may need to be exchanged.

The credentials may be provisioned to the client device 2 in any suitable manner, such that one or more credentials may be provided during a factory bootstrapping process, and/or one or more credentials may be provided via bootstrap server 6, and/or one or more credentials may be provided upon connection to a server 4.

Figure 2:
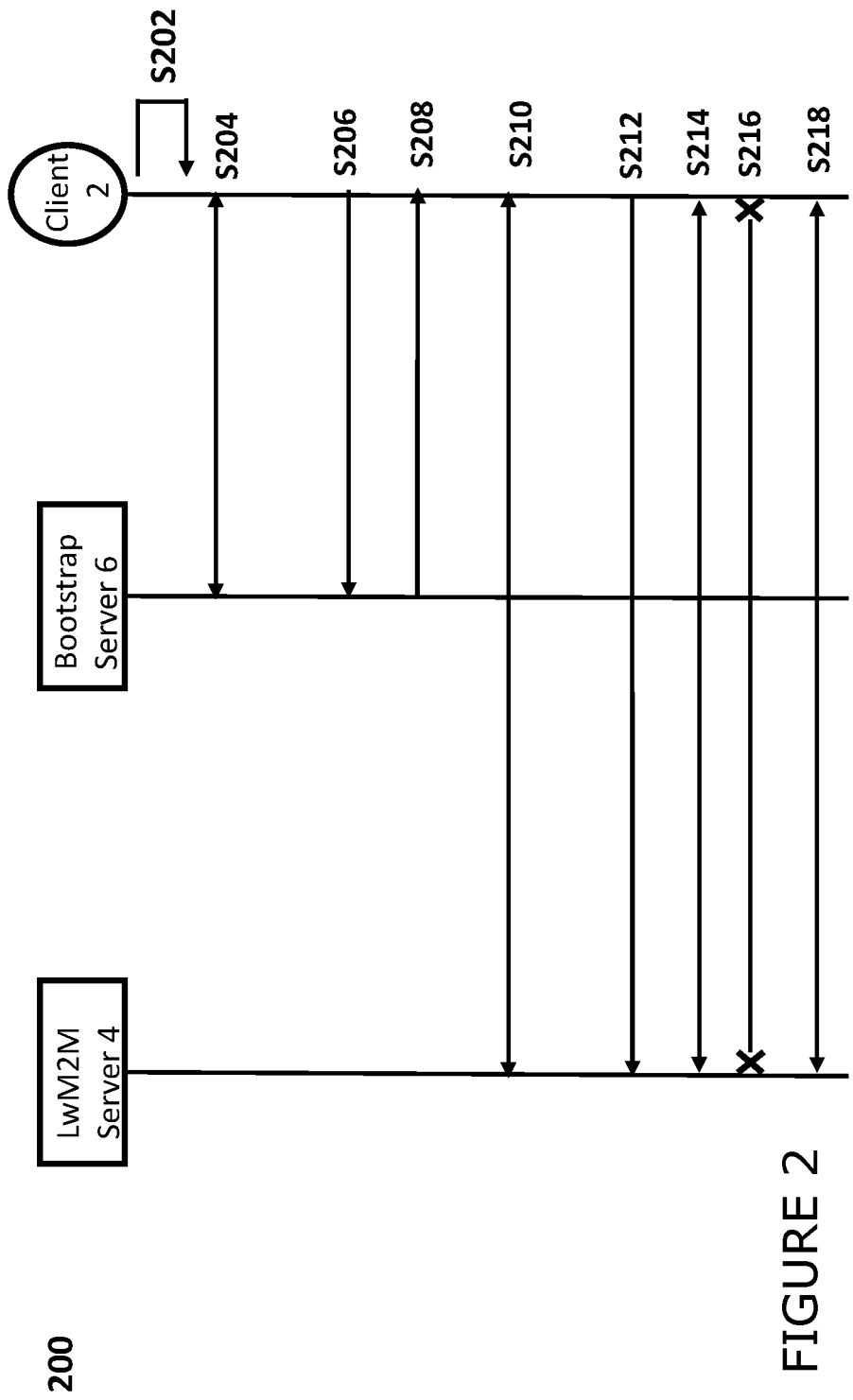
FIG. 2 shows an example of the client device registering with a LwM2M server.

FIG. 2 shows an example of the client device 2 registering with a LwM2M server 4.

As mentioned previously, client device 2 is provisioned with credential data (such as cryptographic keys and digital certificates), as part of a factory bootstrap process (step 202). Without this credential data, client device 2 cannot establish trust with other machines in the system/network in which the client device 2 is installed.

In this example, client device 2 is provisioned with a digital certificate for the client device 2 (which comprises information about the client device's public key), also referred to herein as Cert(C), and a private key of a public-private key pair, also referred to herein as Priv(C).

Client device 2 may also be provisioned with information that enables the client device 2 to locate and connect to the bootstrap server 6 the first time the client device 2 is turned on in the system/network in which the device is installed. For example, the client device 2 may be provisioned with an IP address and a server name indication (SNI) of bootstrap server 6, to enable the client device 2 to search for the bootstrap server 6 and connect to it when first powered-up. This information may be provisioned on client device 2 as part of a factory bootstrap, or as part of a configuration or registration process by an owner of client device 2.

Thus, at S204, client device 2 uses the IP address and SNI of bootstrap server 6 to locate bootstrap server 6 and performs a TLS/DTLS connection handshake to establish a secure communications session therewith.

S204 may only need to be performed once, i.e. the first time the client device powers-on when installed in a system/network. However, step S202 may need to be repeated if, for example, the credentials provided to the client device 2 from bootstrap server 6 have an expiry date/lifetime, such that the client device 2 needs to obtain updated/new credentials.

In S204, the client device may transmit a 'ClientHello' message or similar to bootstrap server 6, which may include some information about the client device itself (as specified by the TLS/DTLS protocol). The bootstrap server 6 may reply with a 'hello' message and send the bootstrap digital certificate Cert(B) to client device 102 (step S204). The bootstrap server 6 may also request the client device digital certificate Cert(C) from client device 2. The information sent/requested in steps may be combined in a single step/message. The client device 2 may use Cert(B) to verify the bootstrap server 6. If this verification process is successful, the client device 2 may send Cert(C) to the bootstrap server 6. The client device 2 may also transmit a 'success' or 'authenticated' or 'finished' message to bootstrap server 6 indicating that the bootstrap server 6 has been authenticated/verified.

The bootstrap server 6 may use Cert(C) to verify the client device 2. If the verification process is successful, the bootstrap server 6 may transmit a 'success' or 'authenticated' or 'finished' message to client device 2 indicating that the client device 2 has been authenticated/verified.

At S206, when the client device 2 is authenticated and the secure communication session established, it sends a bootstrap request to the bootstrap server.

The bootstrap server 6 may be able to determine which credentials the client device 2 has and which credentials the client device 2 requires based on the bootstrap request (e.g. device identifiers therein) and provides missing credentials accordingly. The bootstrap request may comprise credential data (e.g. device identifiers) which the bootstrap server can use to identify the client device 2.

In an illustrative example, the bootstrap server 6 may comprise, for example, a database of all machines which are registered with the bootstrap server, together with information on the permissions/access any particular machine should have, and which credentials a machine has, and may require, to communicate with other machines. In this example, the bootstrap server 6 may determine that the client device 2 requires a private key (of a public-private key pair) for communication between the client device 2 and server 4, Priv(C-S), a digital certificate identifying a relationship between the client device 2 and server 4, Cert(C-S), and a digital certificate of the server 4, Cert(S), and may therefore transmit these credentials at S208.

Bootstrap server 6 may also provide client device 2 with information about the algorithms/cipher suites supported by the server 4 and may indicate which of these algorithms are preferred. This may, as explained above, mean that the client device 2 and server 4 do not have to share lists of algorithms to select the algorithm for use in future communications, which may thereby reduce the amount of data transmitted during a subsequent TLS/DTLS handshake. The credentials are provided to client device 2 in a secure manner, e.g. encrypted using the cryptographic key pair associated with the client device 2 and bootstrap server 6. The client device 2 may store these newly-received credentials in storage alongside the manufacturer-provided credentials and may access them from storage when a secure communication session with server 4 is to be established.

At S210 the client device 2 initiates a TLS/DTLS connection handshake between a client with server 4, whereby the client device 2 transmits a 'ClientHello' message (or similar) to server 4. The 'ClientHello' message may comprise a random byte string that is used in subsequent computations in the connection handshake process.

The client device 2 may have been provisioned with the SNI and IP address of the server 4 by the bootstrap server 106. (It will be understood that the server 4 could equally trigger the connection handshake by sending the client device 2 the initial 'hello' message and that the process in FIG. 2 is merely exemplary.)

The server 4 responds by transmitting a 'ServerHello' message to client device 2. The 'ServerHello' message may comprise a further random byte string, and its own digital certificate, Cert(S). If the server 4 requires the client device's digital certificate to authenticate the client device 2, then the server 4 also transmits a message requesting Cert (C). This request for Cert(C) may be included in the 'ServerHello' message.

The client device 2 verifies Cert(S) received from server 4. If the verification is unsuccessful, the client device 2 may terminate the process, or send an error message (e.g. 'fail') to the server 4 before terminating the connection handshake process. If the verification is successful, the client device 2 transmits an encrypted random byte string to server 4 (not shown in FIG. 2).

The random byte string is encrypted using the server's 4 public key, and the encrypted random byte string enables both the client device and server to compute a shared cryptographic key to be used for encrypting subsequent messages exchanged between the machines.

If the server 4 requested Cert(C), the client device 2 transmits Cert(C) to server 4. The client device 2 may also transmit a random byte string encrypted with the client device's private key. The server 4 verifies Cert(C) received from client device 2. If the verification is unsuccessful, the server 4 may terminate the process, or send an error message to the client device 2 before terminating the connection handshake process.

The client device 2 transmits a 'finished' message to server 4, which is encrypted with the secret key. This 'finished' message indicates that the client device 2 part of the connection handshake process is complete. Similarly, the server 4 transmits a 'finished' message to client device 2, which is encrypted with the shared cryptographic key.

This 'finished' message indicates that the server 4 part of the connection handshake process is complete. The secure communication session has now been established, and the client device 2 and server 4 may exchange messages during the session which are encrypted with the shared cryptographic key.

At S212 the client device 2 registers with the LwM2M server by transmitting a registration message comprising identifiers to enable the LwM2M server to identify the objects, object instances and/or resources on the client device 2. The LwM2M server stores the identified objects, object instances and/or resources in a resource directory 30. Once the data is in the resource directory 30. The LwM2M server, or a service, can then look-up the resource directory 30 and access the objects, object instances and/or resources on the client device 2. Similarly, the device can access the LwM2M server and/or one or more services. Such access is depicted at S214 whereby the client device/LwM2M server are depicted as exchanging application data.

At S216 the secure communication session is depicted as being terminated. The secure communication session may terminate when, for example, the client device and/or LwM2M disconnect; when the client powers down; when a session lifetime expires. It will be appreciated that these are only examples of reasons for session termination, and the claims are not limited in this respect.

At S218 the client device initiates a session resumption process by performing the TLS/DTLS connection handshake with the LwM2M server as described above at S214, whereby the TLS/DTLS connection handshake process requires the client device 2 and server 4 to share their digital certificates, and for each machine to verify the received digital certificates. This requires a considerable amount of data to be exchanged before they can even begin exchanging encrypted messages.

As explained earlier, the TLS/DTLS protocols may be used to secure the communication between an IoT device and a remote (e.g. cloud-based) server and/or service. During a TLS/DTLS connection handshake, the IoT device and the remote server exchange their digital certificates. These can be fairly large, particularly if they contain not just a single certificate but an entire chain of certificate, or if one or more certificates are RSA certificates. Some changes to the original TLS/DTLS protocol have already been proposed. For example, RFC 7924 proposes a modification to the TLS protocol to avoid transmission of server digital certificates. However, this modification still requires a full handshake to be executed. Similarly, RFC 6066 proposes a modification to the TLS protocol to avoid transmission of a client certificate, but here a URL pointing to the client certificate needs to be uploaded somewhere on the Internet and must be known to and accessible by the client. These proposals have not therefore reduced the burden placed on constrained devices (such as IoT devices) when establishing communication sessions with remote servers/services. The present techniques seek to address this burden.

Figure 3:
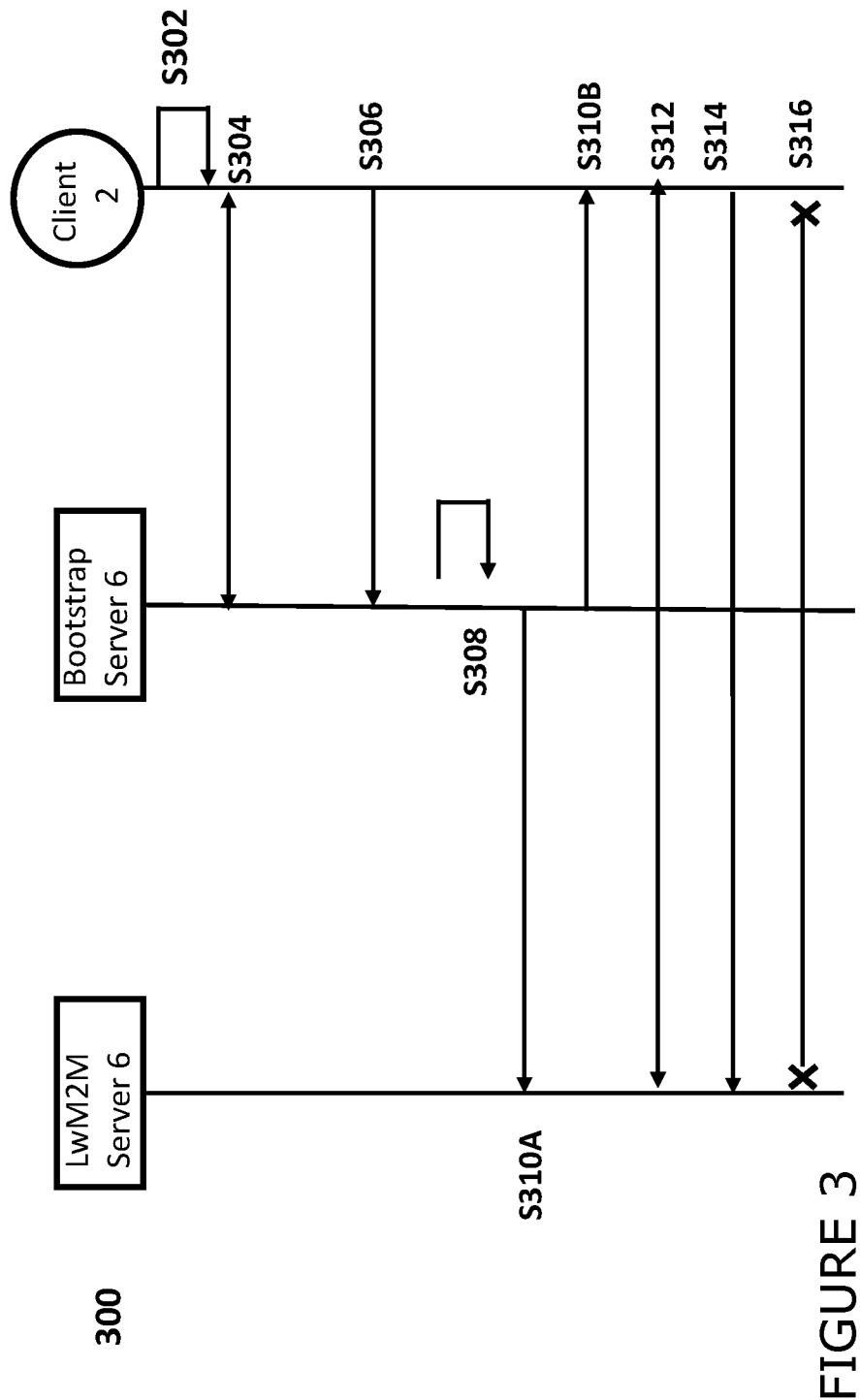
FIG. 3 shows an illustrative example of a bootstrap process.

FIG. 3 shows an illustrative example of a bootstrap process 300, whereby the client device 2 is provisioned with credential data from bootstrap server 6 to establish a secure communication session with LwM2M server 4 according to an embodiment.

At S302, the client device 2 is provisioned with particular credentials (such as cryptographic keys and digital certificates), as part of a factory bootstrap process, and at S304 the client device performs a TLS/DTLS connection handshake process with bootstrap server, for example, as described at S204 above.

At S306, when the secure communication session is established, the client device 2 sends a bootstrap request to the bootstrap server 6, wherein the bootstrap request comprises credential data to enable the bootstrap server 6 identify the client device 2 and determine the credential data required to be provisioned thereon in order to communicate with the LwM2M server 4.

At S308 the bootstrap server 6 obtains credential data to enable the client device 2 establish a secure communication session with the LwM2M server 2, and vice versa, whereby in the present embodiment, the credential data comprises cryptographic key data. In an example the cryptographic key data comprises a cryptographic session key (e.g. a symmetric key). In a further example the cryptographic key data comprises seed data (e.g. a nonce) which may be used to generate a session key. The credential data also comprises a session ID and a cipher suite, which will be described in further detail in FIG. 4.

At S310a, the bootstrap server provisions the credential data on the LwM2M server, and at S310b the bootstrap server provisions the credential data on the client device. It will be appreciated that bootstrap server 6 may also provision the client device 2 with information that enables the client device 2 to locate and connect to the LwM2M server 4. Similarly, bootstrap server 6 may also provision the LwM2M server 4 with information that enables the LwM2M server 4 to locate and connect to the client device 2.

At S312 the client device 2 and LwM2M server 4 perform a TLS/DTLS connection handshake using, for example, the shared credential data whereby the client device 2 transmits a 'ClientHello' message (or similar) to server 4.

The server 4 responds by transmitting a 'ServerHello' message to client device 2. The 'ServerHello' message may comprise a random byte string signed and/or encrypted with a shared cryptographic key. In embodiments the shared cryptographic key may be generated from seed data.

The client device 2 verifies the message by verifying the signature or/decrypting random byte. The 'ServerHello' message may include the original, unencrypted, random byte for comparison with the decrypted version. If the verification is unsuccessful, the client device 2 may terminate the process, or send an error message to the server 4 before terminating the handshake process. If the verification is successful, the client device 2 transmits a signed and/or encrypted random byte string to server 4. In embodiments the client device may sign and/or encrypt the random byte received from the LwM2M server 4.

The random byte string is encrypted using the shared cryptographic key, and the encrypted random byte string enables both the client device and server to verify that each have an expected cryptographic key.

The client device 2 transmits a 'finished' message to server 4. Similarly, the server 4 may transmit a 'finished' message to client device 2.

This 'finished' message indicates that the server 4 part of the connection handshake process is complete. The secure communication session has now been established, and the client device 2 and server 4 may exchange messages during the session which are encrypted with the shared session key. For example, at S314, the client device 2 sends a registration request. When registered, the client device 2 and LwM2M server 4 can exchange application data until the session terminates at S316.

In embodiments, when the secure communication session is established, a security state record of the secure communication session is created by the client device 2 and/or by the Lwm2M server 4. The security state record defines inter alia one or more parameters used to establish the secure communication session, such as the cryptographic keys used (e.g. shared or negotiated), the cipher suites used (e.g. to encrypt data, generate the shared cryptographic keys from seed data), the machines involved etc. The security state record may be stored in storage circuitry on the respective machines (e.g. client device and/or LwM2M server 4), and the security state record for a particular secure communication session may be identified by a security state identifier, which in the present illustrative example is the session ID provisioned by the bootstrap server. In an illustrative example, all security state records created by a machine may be stored in a table in storage thereon, whereby the security state records are indexed by their respective session IDs.

Figure 4:
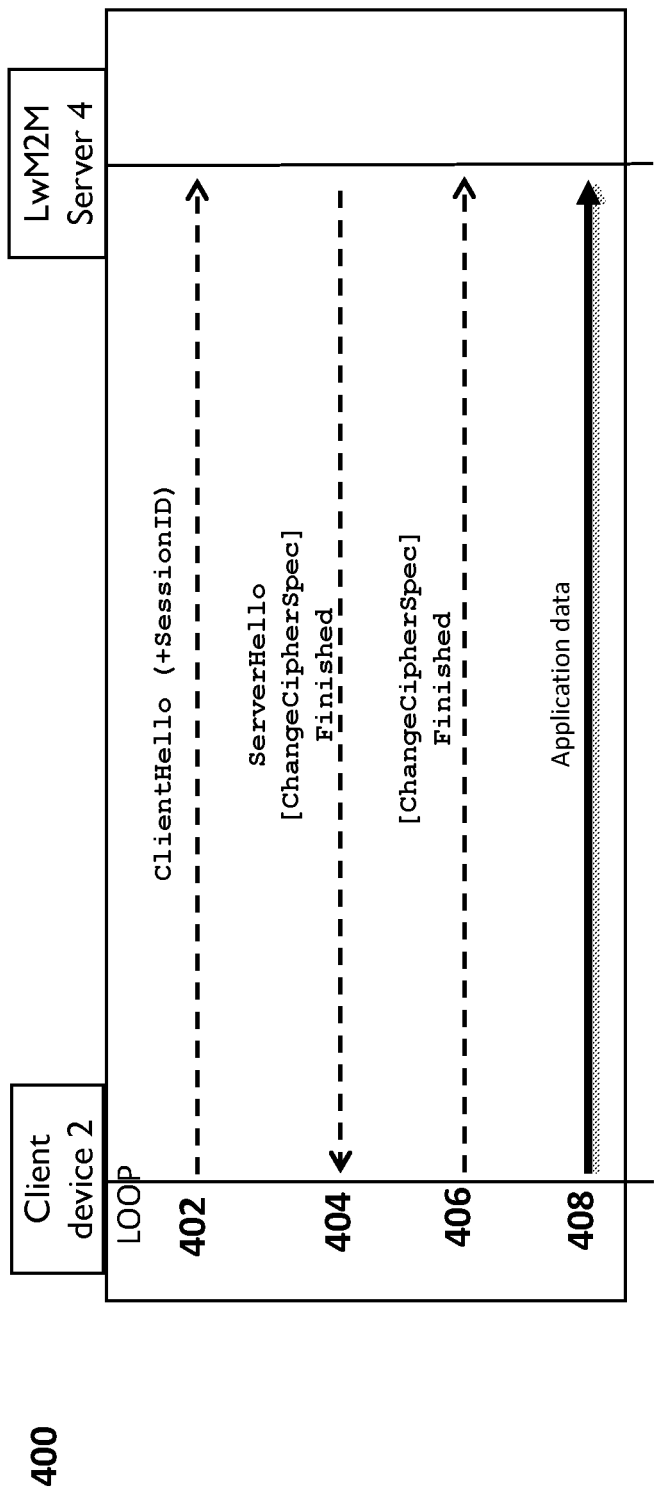
FIG. 4 shows an example of a session resumption handshake between the client device and LwM2M server.

The client device 2 uses the session ID to resume or re-establish a secure communications session with the LwM2M server 4, and FIG. 4 shows an example of a session resumption handshake 400 between the client device and LwM2M server to resume or re-establish the secure communications session.

In the present illustrative example, at S402 the client device initiates a session resumption handshake by transmitting a 'ClientHello' message. The 'ClientHello message' includes the session ID, which is used by the LwM2M server to obtain the security state record in storage. At S404 the LwM2M server sends a ServerHello[ChangeCipherSpec] message, which may be used to confirm the cipher suite to be used for encryption of data with the shared session key, whereby the cipher suite may be defined in the security state record.

At S406 the client device sends a further message also confirming the cipher suite to be used for encryption with the shared session key.

At S408 the client device 2 and LwM2M server 4 can exchange application data encrypted/decrypted with the shared session key until the session terminates (not shown). The client device and LwM2M server can repeat the session resumption handshake to resume the secure communication sessions as appropriate.

Such functionality means that the resumption handshake can establish a secure communication session without the need for a TLS/DTLS connection handshake, thus accelerating the resumption of secure communications session in comparison to a TLS/DTLS connection handshake. Such functionality also avoids the need for the LwM2M server and client device to exchange relatively large certificates in order to resume a secure communication sessions.

In embodiments it may sometimes be beneficial to define the lifetime for at least some of the credential data that enables a client device to establish a secure communication session with a LwM2M server. It may also be beneficial to be able to invalidate the credential data.

For example, the shared master secret may be set to expire after a period of time to prevent a scenario where a $3^{rd}$ party hacks the client device and can communicate with the LwM2M server unchecked. In other examples a client device may need to be blacklisted by a device management platform, and the LwM2M server may be instructed not to establish a secure communication session with a particular blacklisted session key. In a further example, the LwM2M server or client device may be subject of an attack/attempted attack by a $3^{rd}$ party, and the shared master secret invalidated as a precaution.

Figure 5:
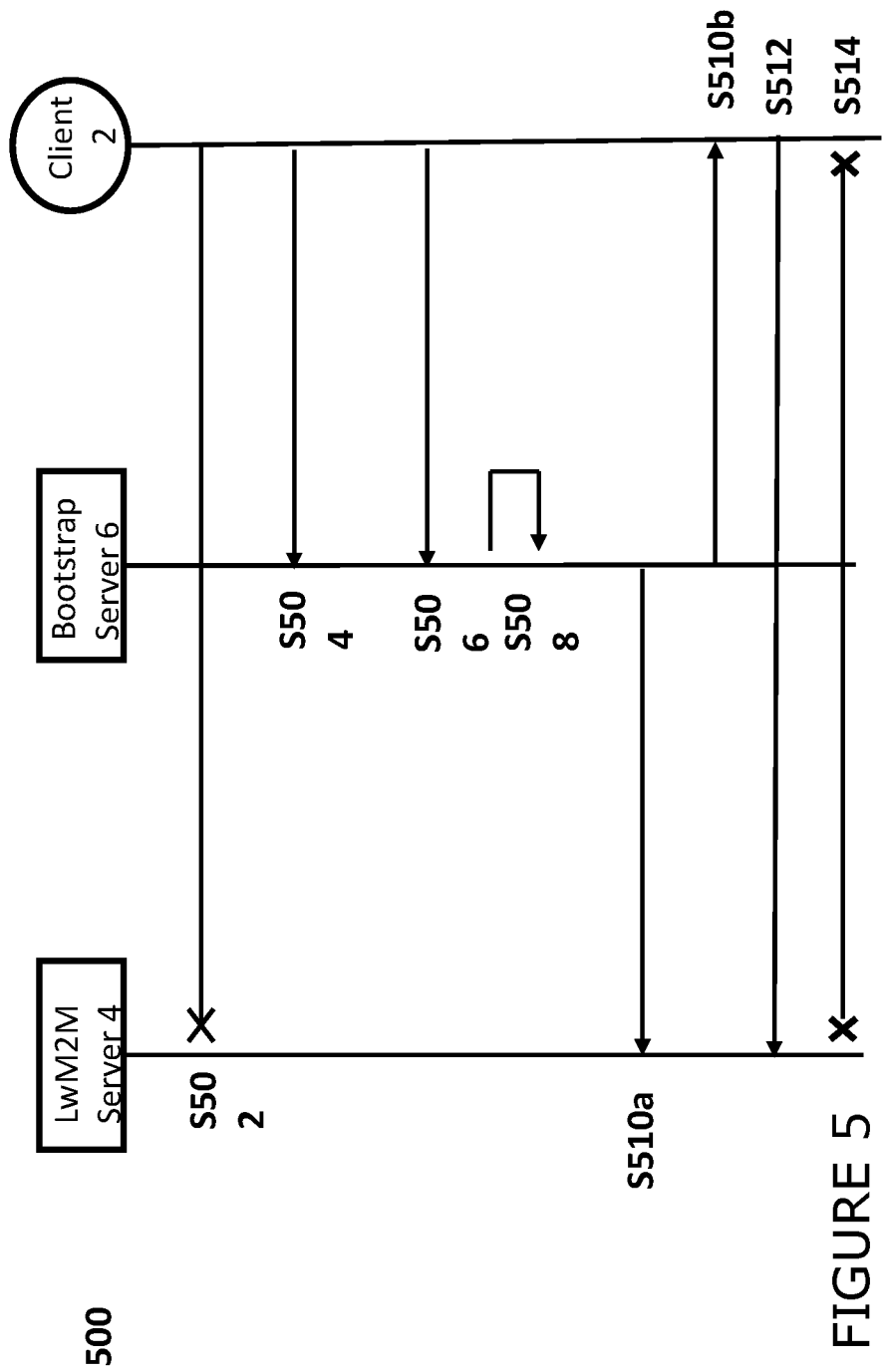
FIG. 5 shows an example of a process in which the client device attempts to establish a secure communication session with the LwM2M server.

FIG. 5 shows an example of a process 500 in which at S502 the client device 2 attempts to establish a secure communication session with the LwM2M server using an invalid shared session key. The LwM2M server 4 may send an error message confirming that authentication failed. The error message may also include instructions to enable the client device 2 obtain updated credential data from the bootstrap server 6 (or another server or service). In another embodiment the client device 2 may be pre-programmed to communicate with the bootstrap server 6 (or another server or service) to obtain the updated credential data in the event of the credential data thereon becoming invalid.

At S504 the client device 2 performs a TLS/DTLS connection handshake process with the bootstrap server 6 for example, as described at S204 above. In a further embodiment the client device may resume a secure communication session with the bootstrap server using as session ID in a substantially similar manner as described in FIG. 4 above.

At S506, when the secure communication session is established, the client device 2 sends a request to the bootstrap server 6 for updated credential data, wherein the bootstrap request comprises credential data to enable the bootstrap server 6 identify the client device 2 and determine the updated credential data required to be provisioned thereon to communicate with the LwM2M server 4.

At S508 the bootstrap server 6 obtains the updated credential data to enable the client device 2 to establish a secure communication session with the LwM2M server 2, and vice versa, whereby in the present embodiment, the updated credential data comprises updated cryptographic key data.

At 510a, the bootstrap server provisions the updated credential data on the LwM2M server, and at 510b the bootstrap server provisions the updated credential data on the client device 2.

At S512 the client device 2 performs the session resumption handshake substantially as described in FIG. 4, whereby at S402 the client device initiates a resumption handshake by transmitting a 'ClientHello' message which includes the session ID to identify the previously created security state record.

As at S404 the LwM2M server sends a ServerHello [ChangeCipherSpec] message, which may be used to confirm the cipher suite to be used for encryption with the updated shared session key.

As at S406 the client device sends a further message also confirming the cipher suite to be used for encryption with updated shared session key.

As at S408 the client device 2 and LwM2M server 4 can exchange application data encrypted/decrypted with the updated shared session key until the session terminates (not shown). The client device and LwM2M server can repeat the session resumption handshake to resume the secure communication sessions as appropriate.

Such functionality means that the client device 2 and LwM2M server 4 can obtain valid credential data when shared credential data becomes invalid (e.g. due to expiration).

Figure 6:
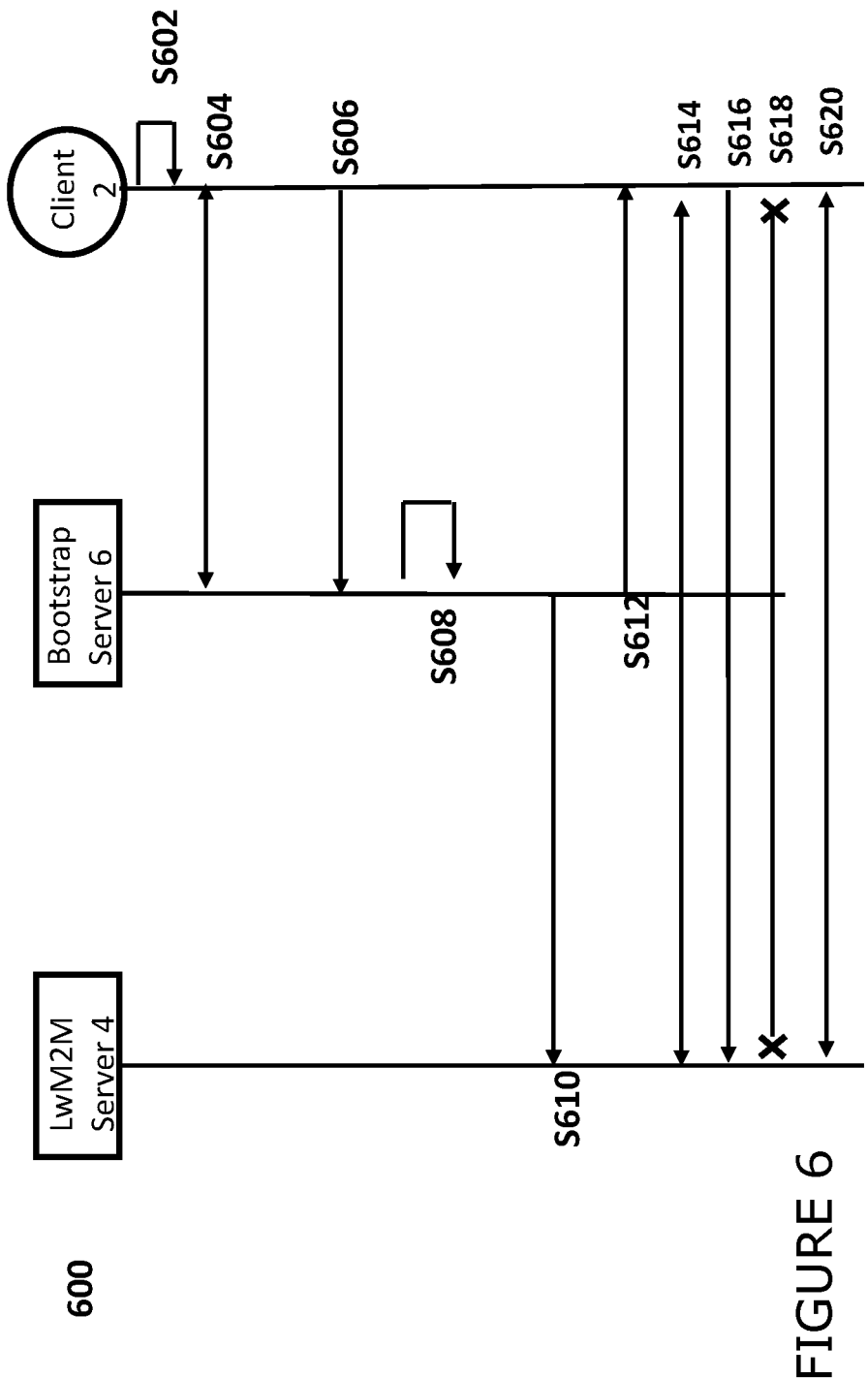
FIG. 6 shows a further example of a bootstrap process.

FIG. 6 shows a further example of a bootstrap process 600, whereby the client device 2 is provisioned with credential data from bootstrap server 6 to establish a secure communication session with LwM2M server 4 according to an embodiment.

At S602, the client device 2 is provisioned with particular credentials (such as cryptographic keys and digital certificates), as part of a factory bootstrap process, and at S604 the client device performs a TLS/DTLS connection handshake process with bootstrap server, for example, as described at S204 above.

At S606, when the secure communication session is established, the client device 2 sends a bootstrap request to the bootstrap server 6, wherein the bootstrap request comprises credential data to enable the bootstrap server 6 identify the client device 2 and determine the credential data required to be provisioned thereon in order to communicate with the LwM2M server 4.

At S608 the bootstrap server 6 obtains credential data comprising cryptographic key data to enable the client device 2 establish a secure communication session with the LwM2M server 2, and vice versa, whereby in the present embodiment, the cryptographic key data comprises a symmetric key and a symmetric key identifier.

At S610 the bootstrap server 6 provisions the credential data on the LwM2M server 4, and at S612 the bootstrap server 6 provisions the credential data on the client device 2

At S614 the client device 2 and LwM2M perform a TLS/DTLS connection handshake using the cryptographic key data.

Figure 7:
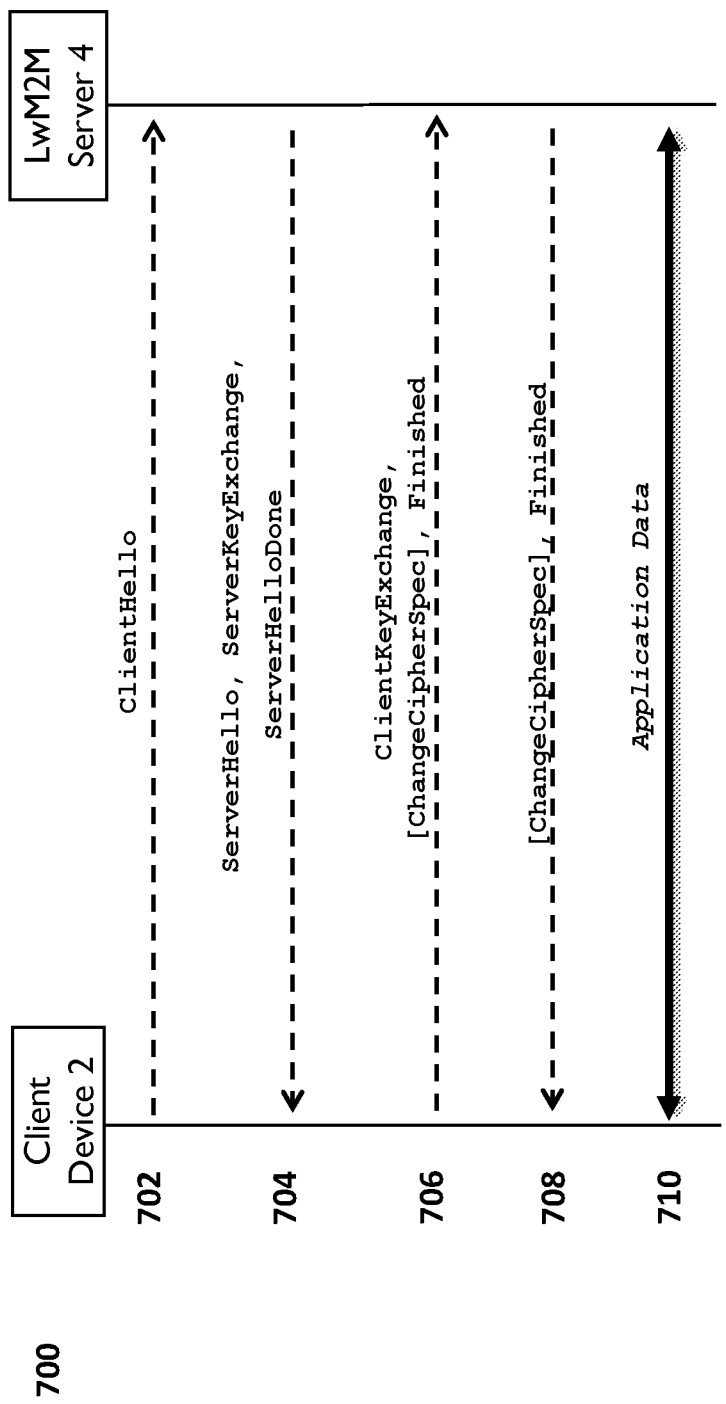
FIG. 7 shows an example of a TLS/DTLS handshake using shared symmetric keys to establish a secure communication session between the client device and the LwM2M server.

FIG. 7 shows an example of a TLS/DTLS connection handshake 700 using the shared symmetric keys to establish a secure communication session between the client device 2 and the LwM2M server 4.

At S702 the client device transmits a 'ClientHello' message to the LwM2M server, where the client device 2 indicates its intention to use a symmetric key. Both the client device 2 and/or LwM2M server 4 may have pre-shared keys with several different machines, so At S704, the LwM2M server 4 transmits a 'ServerHello' message to the client device 2 and includes a "PSK hint", in the 'ServerKeyExchange' portion to aid the client device in selecting which PSK Identity to use. In embodiments the PSK hint may comprise a server identifier. In embodiments the PSK hint could, for example, be a domain name like "example.com". This is useful when a server operates many different services in the backend and uses different symmetric keys for the different services.

At S706, the client device 2 indicates which key to use by including the PSK identity in a 'ClientKeyExchange' response and may further indicate which cipher suites to use for encryption/decryption.

At S708, the LwM2M2 confirms the cipher suites and at S710 the secure communication session is established and encrypted messages (e.g. application data, registration message) can be transmitted between the client device 2 and LwM2M server 4.

Looking again at FIG. 6, at S616, when a secure communication session is established following the connection handshake, the client device 2 sends a registration request. When registered, the client device 2 and LwM2M server 4 can exchange application data until the session terminates at S618.

In an embodiment, as the symmetric keys and cipher suites were identified during the TLS/DTLS connection handshake, the client device 2 and LwM2M server 4 can use the same symmetric keys to send encrypted messages (and decrypt messages) without the need to perform a full TLS/DTLS connection handshake. In such a case the cipher suites specifying, for example, the encryption algorithms will not change from those previously agreed.

Given that a symmetric key may be, for example, up to 500 bytes, whilst a certificate may be 1 MB up to 10 MB when there is a chain of trust, the amount of data required to be exchanged in the TLS/DTLS connection handshake using symmetric key cryptography is much reduced in comparison to using certificates. Furthermore, the amount of data required to be exchanged in for session resumption is much reduced when using symmetric key cryptography in comparison to using certificates.

As described above, in embodiments it may sometimes be beneficial to define the lifetime for at least some of the credential data that enables a client device to establish a secure communication session with a LwM2M server. It may also be beneficial to be able to invalidate the credential data. For example, the shared symmetric key of FIG. 6 may be set to expire after a defined period of time, whereby a new symmetric key may be provisioned on the client device 2, and this may be done by the client device reconnecting with the bootstrap server 6 and performing a full bootstrap, whereby the bootstrap server 6 generates an updated symmetric key and provisions the updated symmetric key on the client device 2 and the LwM2M server 4.

Additionally, or, alternatively, the LwM2M server 4 could generate and/or provision updated symmetric keys on the client device 2 during a secure 3o communication session before expiry of a current symmetric key.

Additionally, or, alternatively, the client device 2 could generate and/or provision updated symmetric keys on the LwM2M server 4 during a secure communication session before expiry of a current symmetric key.

Figure 8:
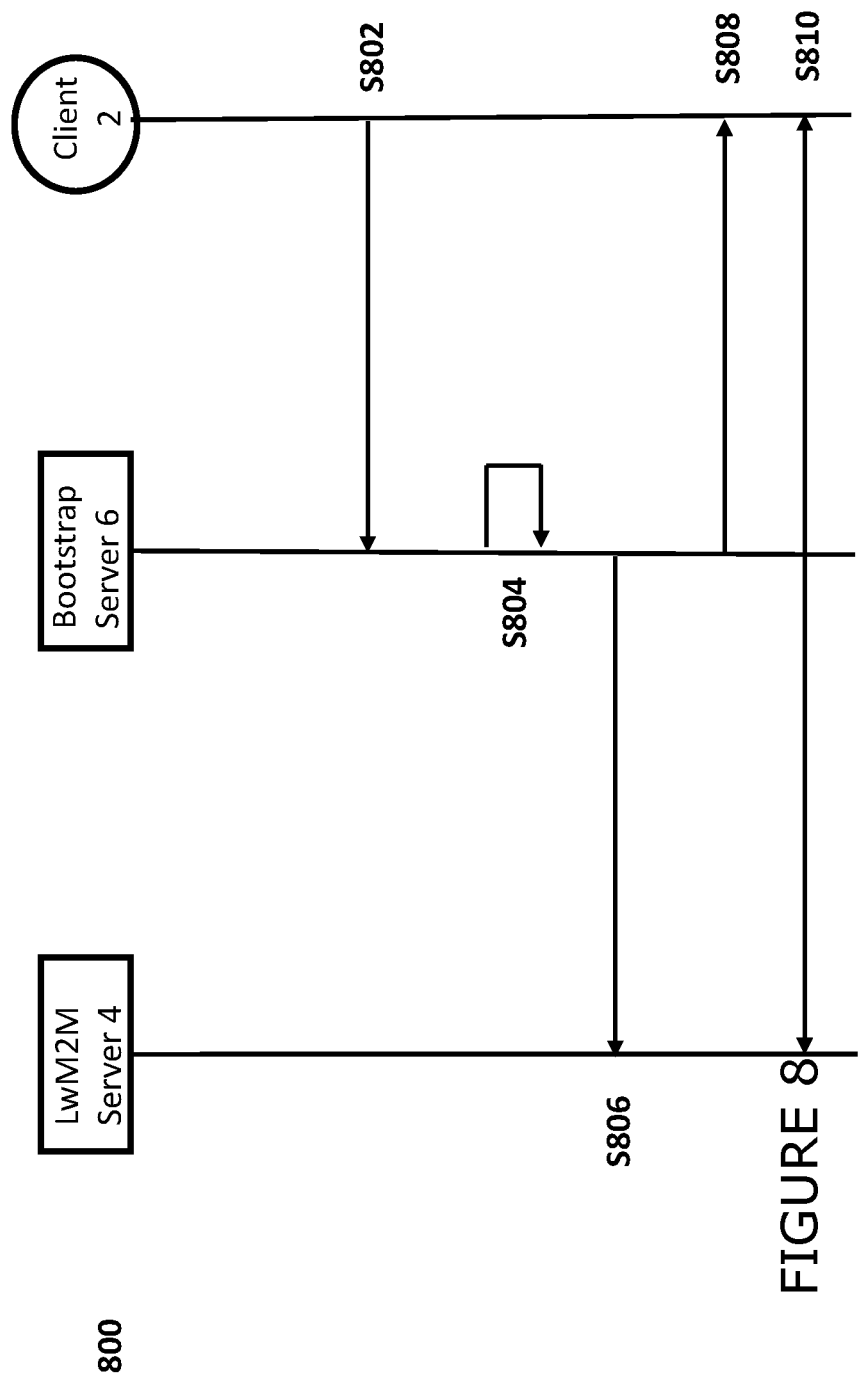
FIG. 8 shows an example of a key update process.

FIG. 8 shows key update process 800 which follows from the process at FIG. 6, whereby the client device 2 requests updated credential data from bootstrap server 6 to re-establish or resume a secure communication session with LwM2M server 4.

At S802 the client device 2 requests an update from the bootstrap server 6. Such a request may be initiated after receiving an error message due to a current key being invalid; or the request may be initiated by the client device 2 before expiry of the symmetric key lifetime (e.g. on monitoring the lifetime) or the client device 2 having being instructed by another entity to obtain updated (e.g. the LwM2M server 4 or the bootstrap server 6).

At S804 the bootstrap server 6, in response to the request, generates updated cryptographic key data comprising a symmetric key and/or seed data.

At S806 the bootstrap server 6 provisions the updated cryptographic key data on the LwM2M server 4 and at S808 provisions the updated cryptographic key data on the client device 2.

In embodiments, when the cryptographic key data comprises seed data, the LwM2M server 4 and client device 2 can generate an updated symmetric key using the shared seed data. In embodiments, the generated updated symmetric key may be derived from a symmetric key used for a previous communications session. Thus, an entity obtaining the seed data without the previous key could not generate a current symmetric key, thereby providing security against a third party obtaining the seed data, but not the previous session key.

At S810, as the symmetric keys and cipher suites were identified during the TLS/DTLS connection handshake the LwM2M server 4 and client device 2 will encrypt/decrypt the application data using the updated symmetric key and cipher suites without the need to perform a resumption handshake.

The techniques described above in provide for a reduction in the data required to establish secure communication sessions between machines, and in some cases remove the need for a resumption handshake between machines (e.g. servers/devices).

Such a reduction may be achieved through the distribution of data to the different machines, without having to amend the various software stacks (e.g. TLS/DTLS stack) on the machines. For example, the credential data required to establish secure communication sessions and/or encrypt data can be stored in, and accessed from, storage circuitry on the device (e.g. cache), and populating the credential data into libraries (e.g. TLS/DTLS libraries) when required. This may be beneficial, especially when other applications may be using the stacks, making it difficult to modify the stacks in operation.

Figure 9:
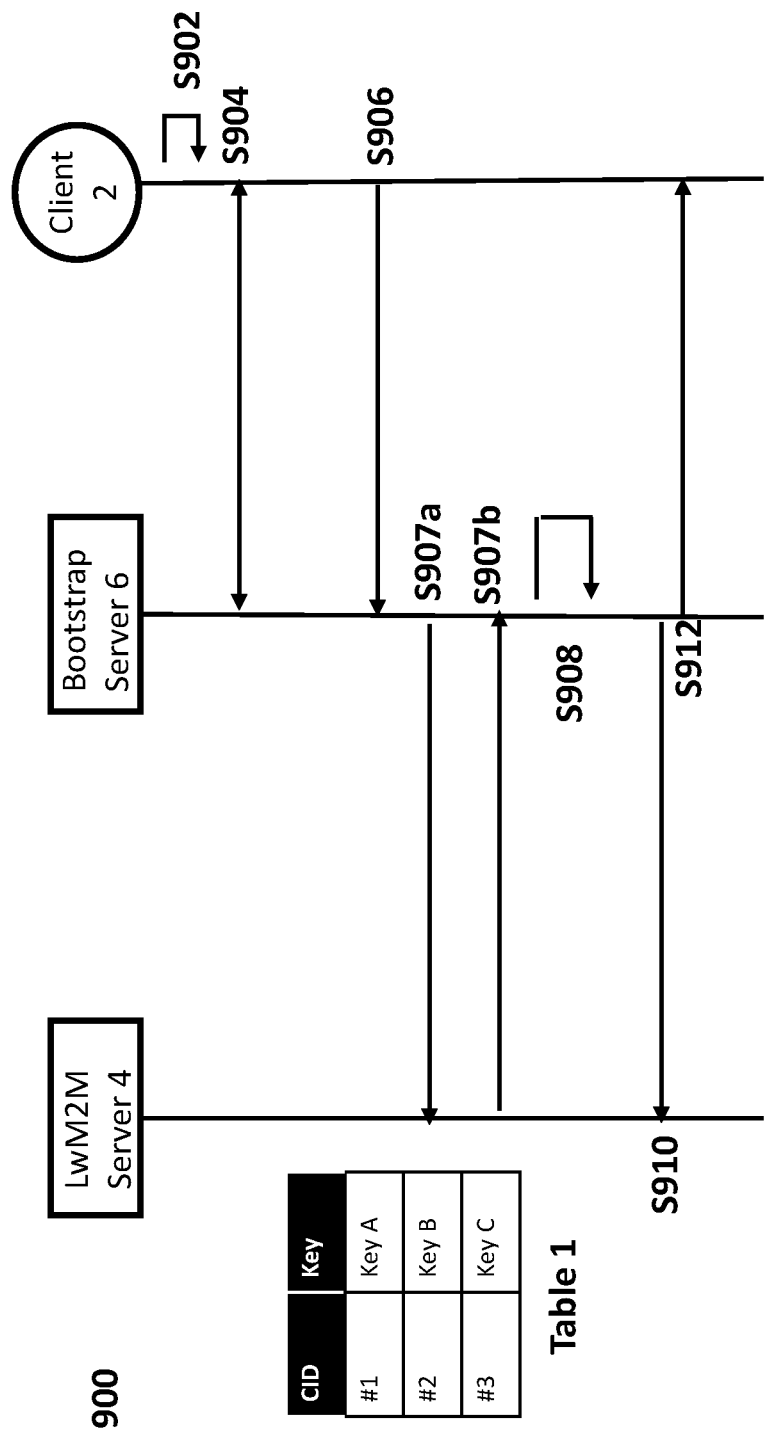
FIG. 9 shows a further example of a bootstrap process.

FIG. 9 shows an example of a bootstrap process 900, whereby the client device 2 is provisioned with credential data from bootstrap server 6 to establish a secure communication session with LwM2M server 4 according to an embodiment.

At S902, the client device 2 is provisioned with particular credentials (such as cryptographic keys and digital certificates), as part of a factory bootstrap process, and at S904 the client device performs a TLS/DTLS connection handshake process with bootstrap server, for example, as described at S204 above.

At S906, when the secure communication session is established, the client device 2 sends a bootstrap request to the bootstrap server 6, wherein the bootstrap request comprises credential data to enable the bootstrap server 6 identify the client device 2 and determine the credential data required to be provisioned to communicate with the LwM2M server 4.

In the embodiment of FIG. 9, at S907a the bootstrap server 6 requests a connection identifier (CID) from the LwM2M server 4 for the client device 2 and at S907b the LwM2M server allocates a CID for the client device 2 and provides it to the bootstrap server 6. The CID may be an 'n'-byte identifier.

At S908 the bootstrap server 6 obtains credential data to enable the client device 2 establish a secure communication session with the LwM2M server 2, and vice versa, whereby in the present embodiment, the credential data comprises cryptographic key data, which in the present illustrative example comprises a symmetric key. The credential data may also comprise one or more parameters which will be used by the client device to encrypt and transmit data to the LwM2M server 4. Such parameters may include, for example: an initialisation vector (IV), a cipher suite indicator, a replay protection indicator, a maximum fragment length indicator, and a compression indicator).

The cipher suite indicator is used to indicate which algorithm(s) to use in the session resumption process.

The IV is used to define an input (e.g. fixed-sized) to a cryptographic primitive that is typically required to be random or pseudorandom. The IV may be used for encryption of data.

The replay protection indicator is used to indicate whether replay protection is enabled or disabled.

DTLS provides a mechanism for fragmenting a handshake message over a number of records, each of which can be transmitted separately, thus avoiding IP fragmentation. When transmitting the handshake message, the sender divides the message into a series of N contiguous data ranges. These ranges may not be larger than the maximum handshake fragment length and may jointly contain the entire handshake message. When a server/client device receives a handshake message fragment, it may buffer it until it has the entire handshake message. The maximum fragment length indicator is used to indicate the maximum fragment length.

The compression indicator is used to indicate what compression is used in the communications.

At S910 the bootstrap server 6 provisions credential data on the LwM2M server 4, the credential data comprising cryptographic key data in the form of a symmetric key, the credential data further comprising one or more parameters which will be used by the LwM2M server to encrypt and transmit data to the client device, such as the IV and a cipher suite(s). The credential data may also include a device identifier for the client device 2. The LwM2M server 4 may store the symmetric key in a key table, whereby the symmetric key can be indexed by the CID allocated for the client device 2.

At S912 the bootstrap server 6 provisions credential data on the client device 2, the credential data comprising the symmetric key, the IV and the cipher suite. The credential data may also indicate the length of the CID. The credential data may also include a location identifier for the LwM2M server 4. The client device 2 may store the symmetric key in a key table in storage thereon, whereby the symmetric key can be indexed by the CID provisioned to the client device 2.

Figure 10:
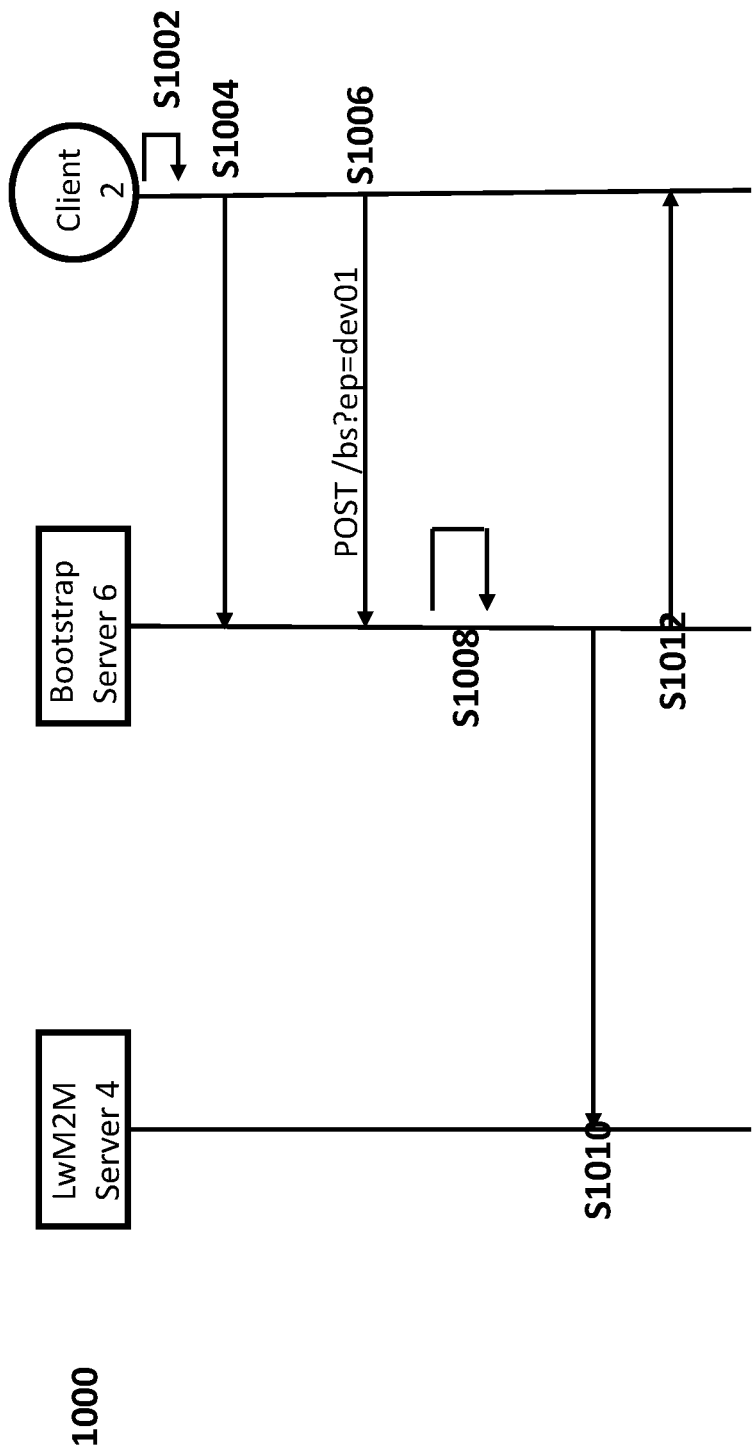
FIG. 10 shows a further example of a bootstrap process.

In embodiments the CID may be generated by the bootstrap server 6, as depicted in a further example bootstrap process 1000 of FIG. 10.

At S1002, the client device 2 is provisioned with particular credentials (such as cryptographic keys and digital certificates), as part of a factory bootstrap process, and at S904 the client device performs a TLS/DTLS connection handshake process with bootstrap server, for example, as described at S204 above.

At S1006, when the secure communication session is established, the client device 2 sends a bootstrap request to the bootstrap server 6, wherein the bootstrap request comprises credential data to enable the bootstrap server 6 identify the client device 2 and determine the credential data required to be provisioned to communicate with the LwM2M server 4.

At S1008 the bootstrap server 6 obtains credential data to enable the client device 2 establish a secure communication session with the LwM2M server 2, and vice versa, whereby in the present embodiment, the credential data comprises cryptographic key data, which in the present illustrative example comprises a symmetric key. In the present embodiment, the bootstrap server 6 also allocates a CID for the LwM2M server and client device 2 as credential data.

The credential data may also comprise one or more parameters which will be used by the client device to encrypt and transmit data to the LwM2M server 4. Such parameters may include, for example: an initialisation vector (IV), a cipher suite indicator, a replay protection indicator, a maximum fragment length indicator, a compression indicator, a length of CID indicator).

The length of CID indicator is used to indicate the maximum length of the CID.

At S1010 the bootstrap server 6 provisions credential data on the LwM2M server 4, the credential data comprising the symmetric key, the IV, the cipher suite and CID. The credential data may also include a device identifier for the client device 2 and other data not listed here may also be provisioned on the LwM2M server 4. The LwM2M server 4 may store the symmetric key in a key table, whereby the received symmetric key can be indexed by the received CID.

At S1012 the bootstrap server 6 provisions credential data on the client device 2, the credential data comprising the symmetric key, the IV, the cipher suite and CID. The credential data may also include a location identifier for the LwM2M server 4 and other data not listed here may also be provisioned on the LwM2M server 4. The client device 2 may store the symmetric key in a key table, whereby the received cryptographic key can be indexed by the received CID.

Such functionality means that the bootstrap server 6 has control over the allocation of the CID, and the bootstrap server 6 can provide an updated CID to the LwM2M server 4 and client device 2 when requested, for example, by the client device 2 or the LwM2M server 4 or before the CID expires.

Figure 11:
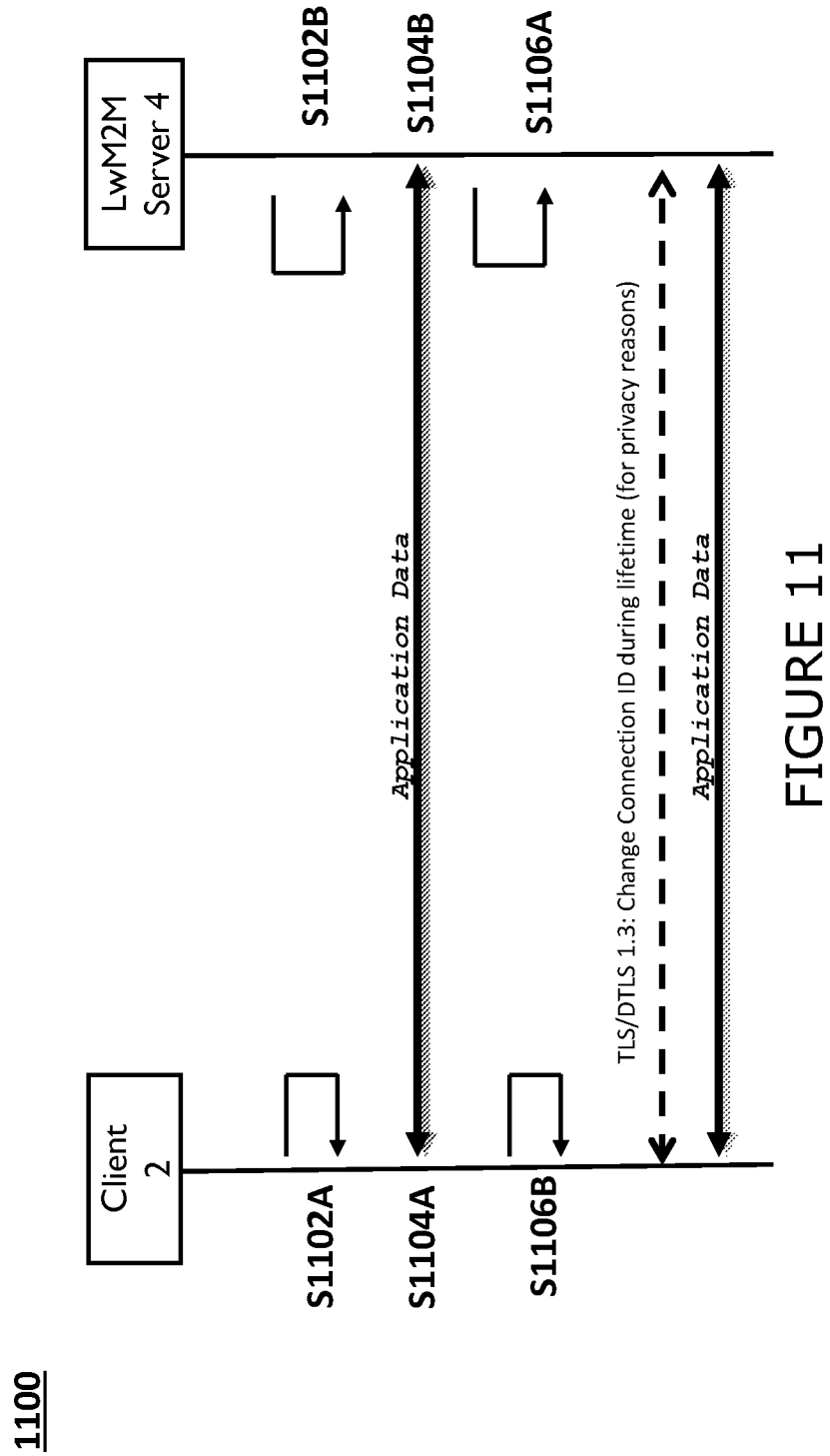
FIG. 11 shows an example process for establishing a secure communication session between the client device and LwM2M server.

FIG. 11 shows an example process 1100 for establishing a secure communication session between a client device 2 and LwM2M server 4 using the CID.

At S1102A the client device 2 will encrypt application data (or a registration message in the case of registration) using the symmetric key, for example, in accordance with one or more parameters of the credential data (e.g. the cipher suite, IV etc.). The client device may then, at S1104A, transmit to the LwM2M server the encrypted application data in a message along with the CID, whereby the message will be generated in accordance with the one or more parameters provisioned by the bootstrap server 6, for example in accordance with a maximum fragment length indicator, and a compression indicator.

At S1106A, after receiving the encrypted application data and CID from the client device 2 the LwM2M server will use the CID as an index to the table of keys to identify the corresponding symmetric key and will decrypt the encrypted application data using the symmetric key, for example, in accordance with the cipher suite provisioned by the bootstrap server 6. As an illustrative example depicted in Table 1 in FIG. 9, the CID allocated to client device 2 may be #1. As such, when a client device 2 sends a message and includes the CID #1 and data encrypted using KeyA, the LwM2M server 4 will use the CID #1 as in index to Table1, identify KeyA and decrypt the encrypted data. A similar table may be established at the client device 2.

The LwM2M server 4 may also communicate with the client device 2 in a similar manner, whereby at S1102B the LwM2M server 4 will encrypt application data using the cryptographic key data provisioned thereon, for example, in accordance with the cipher suite provisioned by the bootstrap server 6. The LwM2M server 4 may also use one or more parameters in the credential data (e.g. IV) when encrypting the application data e.g. as a randomised component into an initial plain text. The LwM2M server 4 may then, at S1104B, transmit to the client device 2 the encrypted application data in a message along with the CID, whereby the message will be generated in accordance with the one or more parameters provisioned by the bootstrap server 6, for example in accordance with a maximum fragment length indicator, and a compression indicator.

At S1106B, after receiving the encrypted application data and CID from the LwM2M server 4, the client device 2 will use the CID as an index to the table of keys to identify the corresponding symmetric key and will decrypt the encrypted application data accordingly.

Thus, the cryptographic key data (and other parameters required to encrypt/decrypt data) may be seen as a security state record, whereby both the client device 2 and LwM2M server 4 create respective security state records, which are indexed by the CID.

Such functionality means that the client device 2 and LwM2M server 4 can establish a secure communication session and send secure communications with each other in a secure manner without performing a TLS/DTLS connection or resumption handshake.

As described previously, it may sometimes be beneficial to define the lifetime for at least some of the credential data that enables a client device to establish a secure communication session with a LwM2M server. It may also be beneficial to be able to invalidate the credential data As depicted in FIG. 11, the LwM2M server 4 could update the CID each session or after an agreed number of sessions (e.g. as defined in a cipher suite, or by one or more instructions in an encrypted application message), and provision the CID to the client device 2.

Thus, the LwM2M server 4 and client device 2 will then update the respective security state records to be indexed with the new CID. Thus, updating the CID may improve security because a $3^{rd}$ party gaining access to an previous version will not be capable of establishing a secure communication session.

The techniques described above in FIGS. 9 to 11 provide for a reduction in the data required to establish secure communication sessions between machines, and in some cases remove the need for a connection resumption handshake between some machines (e.g. client device/LwM2M servers).

Such a reduction may be achieved through the distribution of data to the different machines.

Embodiments of the present techniques may provide implementations which conform to the Open Mobile Alliance Lightweight Machine to Machine Technical Specification, Version 1.0 and to one or more revision(s) thereof although the claims are not limited in this respect.

Embodiments of the present techniques also provide a non-transitory data carrier carrying code which, when implemented on a processor, causes the processor to carry out the methods described herein.

The techniques further provide processor control code to implement the above-described methods, for example on a general purpose computer system or on a digital signal processor (DSP). The techniques also provide a carrier carrying processor control code to, when running, implement any of the above methods, in particular on a non-transitory data carrier or on a non-transitory computer-readable medium such as a disk, microprocessor, CD- or DVD-ROM, programmed memory such as read-only memory (firmware), or on a data carrier such as an optical or electrical signal carrier. The code may be provided on a (non-transitory) carrier such as a disk, a microprocessor, CD- or DVD-ROM, programmed memory such as non-volatile memory (e.g. Flash) or read-only memory (firmware). Code (and/or data) to implement embodiments of the techniques may comprise source, object or executable code in a conventional programming language (interpreted or compiled) such as C, or assembly code, code for setting up or controlling an ASIC (Application Specific Integrated Circuit) or FPGA (Field Programmable Gate Array), or code for a hardware description language such as Verilog™ or VHDL (Very high speed integrated circuit Hardware Description Language). As the skilled person will appreciate, such code and/or data may be distributed between a plurality of coupled components in communication with one another. The techniques may comprise a controller which includes a microprocessor, working memory and program memory coupled to one or more of the components of the system.

Computer program code for carrying out operations for the above-described techniques may be written in any combination of one or more programming languages, including object oriented programming languages and conventional procedural programming languages. Code components may be embodied as procedures, methods or the like, and may comprise sub-components which may take the form of instructions or sequences of instructions at any of the levels of abstraction, from the direct machine instructions of a native instruction set to high-level compiled or interpreted language constructs.

It will also be clear to one of skill in the art that all or part of a logical method according to the preferred embodiments of the present techniques may suitably be embodied in a logic apparatus comprising logic elements to perform the steps of the above-described methods, and that such logic elements may comprise components such as logic gates in, for example a programmable logic array or application-specific integrated circuit. Such a logic arrangement may further be embodied in enabling elements for temporarily or permanently establishing logic structures in such an array or circuit using, for example, a virtual hardware descriptor language, which may be stored and transmitted using fixed or transmittable carrier media.

In an embodiment, the present techniques may be realised in the form of a data carrier having functional data thereon, said functional data comprising functional computer data structures to, when loaded into a computer system or network and operated upon thereby, enable said computer system to perform all the steps of the above-described method.

Those skilled in the art will appreciate that while the foregoing has described what is considered to be the best mode and where appropriate other modes of performing present techniques, the present techniques should not be limited to the specific configurations and methods disclosed in this description of the preferred embodiment. Those skilled in the art will recognise that present techniques have a broad range of applications, and that the embodiments may take a wide range of modifications without departing from any inventive concept as defined in the appended claims.

The invention claimed is:

1. A computer implemented method for establishing a secure communication session between a client device and a first server, the method performed by the client device comprising:
   searching and connecting to a second server utilizing a first information to locate the second server when the client device is first powered-up, wherein the first information is provisioned as part of a configuration or registration process by an owner of the client device;
   obtaining, from the second server, credential data comprising a session identifier, cryptographic key data and a second information;
   locating and connecting to the first server utilizing the second information;
   performing a full connection handshake with the first server to establish a first secure communication session between the client device and the first server, the full connection handshake comprising:
   generating first session key data based on or in response to the cryptographic key data;
   when the first communication session is established:
   creating a security state record defining one or more parameters for the first secure communication session, the one or more parameters including the first session key data, and associating the session identifier with the security state record, and encrypting data using the first session key data for transmission to the first server or decrypting data received from the first server using the cryptographic key data;
   when the first communication session is terminated:
   obtaining, from the second server or a further server, updated cryptographic key data,
   generating a second session key data based on the updated cryptographic key data,
   updating the security state record to include the second session key data,
   performing a first resumption handshake with the first server to re-establish the first secure communication session, and
   including the session identifier in the first resumption handshake to identify the security state record;
   when the first secure communication session is re-established:

encrypting data using the second session key data for transmission to the first server or decrypting data received from the first server using the second session key data.

2. The method of claim 1, wherein the credential data comprises data shared with the client device and the first server.

3. The method of claim 1, further comprising:
performing a second resumption handshake with the first server using the session identifier to re-establish the secure communication session; and, transmitting, to the first server, data encrypted using the updated cryptographic key data and/or decrypting data received from the first server using the updated cryptographic key data.

4. The method of claim 1, wherein the full connection handshake comprises a TLS/DTLS connection handshake.

5. The method of claim 1, wherein some or all of the credential data comprises a defined lifetime.

6. The method of claim 1, wherein the first server comprises a LwM2M server and/or wherein the client device comprises an LwM2M client.

7. A computer implemented method for establishing a secure communication session between a client device and a first server, the method performed by the first server comprising:
obtaining, from a second server, credential data comprising a session identifier and cryptographic key data and a first information;
locating and connecting to the client device utilizing the first information and subsequent to the client device being first powered-up, and searching and connecting to the second server utilizing a second information provisioned as part of a configuration or registration process by an owner of the client device;
performing a full connection handshake to establish a first secure communication session with the client device, the full connection handshake comprising:
generating first session key data based on or in response to the cryptographic key data;
when the full connection handshake is established:
creating a security state record for the first secure communication session, the security state record defining one or more parameters including the first session key data,
associating the session identifier with the security state record, and
encrypting data using the first session key data for transmission to the client device or decrypting data received from the client device using the cryptographic key data;
when the first communication session is terminated:
obtaining, from the second or a third server, updated cryptographic key data,
updating the one or more parameters to include the updated cryptographic key data,
receiving, from the client device, the session identifier as part of a first resumption handshake,
obtaining the security state record based on or in response to the session identifier,
generating a second session key data based on the updated cryptographic key data,
updating the security state record to include the second session key, and
re-establishing the first secure communication session with the client device based on or in response to one or more of the parameters defined in the security state record,
when the first secure communication session is re-established:
encrypting data using the second session key data for transmission to the client device or decrypting data received from the client device using the second session key data.

8. The method of claim 7, further comprising: receiving, from the client device, the session identifier as part of a second resumption handshake; obtaining the security state record based on or in response to the session identifier; re-establishing the secure communication session with the client device based on or in response to one or more of the parameters defined in the security state record; and, transmitting, to client device, data encrypted using the second session key data and/or decrypting data received from the client device using the second session key data.

9. A non-transitory computer readable storage medium comprising code which when implemented on a processor of a client device causes the processor to establish a secure communication session between the client device and a first server by:
searching and connecting to a second server utilizing first information to locate the second server when the client device is first powered-up, wherein the first information is provisioned as part of a configuration or registration process by an owner of the client device;
obtaining, from the second server, credential data comprising a session identifier and cryptographic key data and second information;
locating and connecting to the first server utilizing the second information;
performing a full connection handshake with the first server to establish a first secure communication session between the client device and the first server, the full connection handshake comprising:
generating first session key data based on or in response to the cryptographic key data;
when the first communication session is established:
creating a security state record defining one or more parameters for the first secure communication session, the one or more parameters including the first session key data, and associating the session identifier with the security state record, and encrypting data using the first session key data for transmission to the first server or decrypting data received from the first server using the cryptographic key data;
when the first communication session is terminated:
obtaining, from the second server or a further server, updated cryptographic key data,
generating a second session key data based on the updated cryptographic key data,
updating the security state record to include the second session key data, and,
performing a first resumption handshake with the first server to re-establish the first secure communication session,
including the session identifier in the first resumption handshake to identify the security state record;
when the first secure communication session is re-established:
encrypting data using the second session key data for transmission to the first server or decrypting data received from the first server using the second session key data.

10. A device to establish a secure communication session with a first server comprising:

processing circuitry; storage circuitry; and communication circuitry, wherein the device is to establish the secure communication session with the first server by:

searching and connecting to a second server utilizing a first information to locate the second server when the client device is first powered-up, wherein the first information is provisioned as part of a configuration or registration process by an owner of the client device;

obtaining, from the second server, credential data comprising a session identifier and cryptographic key data and a second information;

locating and connecting to the first server utilizing the second information;

performing a full connection handshake with the first server to establish a first secure communication session between the client device and the first server, the full connection handshake comprising:

negotiating, with the first server, first session key data based on or in response to the cryptographic key data;

when the first communication session is established:

creating a security state record defining one or more parameters for the first secure communication session, the one or more parameters including the first session key data, and associating the session identifier with the security state record, and encrypting data using the first session key data for transmission to the first server or decrypting data received from the first server using the cryptographic key data;

when the first communication session is terminated:

obtaining, from the second server or a further server, updated cryptographic key data, generating a second session key data based on the updated cryptographic key data, updating the security state record to include the second session key, and performing a first resumption handshake with the first server to re-establish the first secure communication session, and including the session identifier in the first resumption handshake to identify the security state record;

when the first secure communication session is re-established:

encrypting data using the second session key data for transmission to the first server or decrypting data received from the first server using the second session key data.

* * * * *